United States Patent
Fuyuno et al.

(10) Patent No.: US 8,451,243 B2
(45) Date of Patent: May 28, 2013

(54) INFORMATION PROCESSING DEVICE, INFORMATION PROCESSING PROGRAM, AND DISPLAY CONTROL METHOD

(75) Inventors: Tetsuya Fuyuno, Tokyo (JP); Jun Takikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 121 days.

(21) Appl. No.: 13/054,043

(22) PCT Filed: Jul. 15, 2009

(86) PCT No.: PCT/JP2009/062815
§ 371 (c)(1),
(2), (4) Date: Jan. 13, 2011

(87) PCT Pub. No.: WO2010/010835
PCT Pub. Date: Jan. 28, 2010

(65) Prior Publication Data
US 2011/0115737 A1    May 19, 2011

(30) Foreign Application Priority Data

Jul. 25, 2008    (JP) .............................. P2008-191624

(51) Int. Cl.
*G06F 3/041*    (2006.01)
(52) U.S. Cl.
USPC .............................. 345/173; 345/1.1; 345/156
(58) Field of Classification Search
USPC ................... 345/1.1–1.3, 156–158, 168, 173, 345/179, 180; 178/18.01, 19.01; 715/761, 715/773, 863, 864
See application file for complete search history.

(56) References Cited

U.S. PATENT DOCUMENTS

| | | | |
|---|---|---|---|
| 5,900,848 A * | 5/1999 | Haneda et al. ................. | 345/1.1 |
| 6,545,669 B1 * | 4/2003 | Kinawi et al. ................. | 345/173 |
| 6,664,951 B1 * | 12/2003 | Fujii et al. ..................... | 345/173 |
| 6,788,292 B1 * | 9/2004 | Nako et al. ..................... | 345/173 |
| 7,435,169 B2 * | 10/2008 | Ozaki et al. ....................... | 463/7 |
| 7,469,381 B2 * | 12/2008 | Ording ........................... | 715/702 |
| 7,821,780 B2 * | 10/2010 | Choy ....................... | 361/679.06 |
| 7,855,713 B2 * | 12/2010 | Egashira ........................ | 345/156 |
| 8,077,157 B2 * | 12/2011 | Sengupta et al. ............. | 345/173 |
| 8,239,785 B2 * | 8/2012 | Hinckley et al. .............. | 715/863 |

(Continued)

FOREIGN PATENT DOCUMENTS

| | | | |
|---|---|---|---|
| CN | 101176106 A | 5/2008 | |
| JP | 11-73269 A | 3/1999 | |

(Continued)

OTHER PUBLICATIONS

International Search Report for PCT/JP2009/062815 mailed Oct. 27, 2009.

(Continued)

*Primary Examiner* — Joe H Cheng

(57) ABSTRACT

An information processing device includes a plurality of display screens, a display control unit that controls a display operation with respect to each of the display screens, a touch panel attached to the surface of at least one display screen, and an operation reception unit that receives a depression input externally applied to the touch panel by a predetermined pressing member. When the operation reception unit receives a slide operation sliding the pressing member on the touch panel, the display control unit moves and displays display data of one display screen on another display screen.

19 Claims, 16 Drawing Sheets

U.S. PATENT DOCUMENTS

| | | | |
|---|---|---|---|
| 2006/0094502 A1* | 5/2006 | Katayama et al. | 463/31 |
| 2006/0227106 A1* | 10/2006 | Hashimoto et al. | 345/157 |
| 2007/0075915 A1* | 4/2007 | Cheon et al. | 345/1.1 |
| 2008/0204402 A1* | 8/2008 | Hirata et al. | 345/156 |
| 2010/0083154 A1* | 4/2010 | Takeshita | 715/769 |
| 2010/0281416 A1* | 11/2010 | Fuyuno | 715/773 |
| 2011/0096014 A1* | 4/2011 | Fuyuno et al. | 345/173 |
| 2011/0102354 A1* | 5/2011 | Fuyuno et al. | 345/173 |
| 2011/0237303 A1* | 9/2011 | Matsuda | 455/566 |

FOREIGN PATENT DOCUMENTS

| | | | |
|---|---|---|---|
| JP | 2004180021 A | 6/2004 | |
| JP | 2006053678 A | 2/2006 | |
| JP | 2006251202 A | 9/2006 | |
| JP | 2006293477 A | 10/2006 | |
| WO | 2005001964 A | 1/2005 | |
| WO | 2005091117 A | 9/2005 | |

OTHER PUBLICATIONS

Chinese Office Action for CN200980128455.9 dated Aug. 20, 2012.

* cited by examiner

INFORMATION PROCESSING DEVICE, INFORMATION PROCESSING PROGRAM, AND DISPLAY CONTROL METHOD

TECHNICAL FIELD

The present invention relates to information processing devices, information processing programs, and display control methods.

The present application claims priority based on Japanese Patent Application No. 2008-191624 filed in Japan on Jul. 25, 2008, the content of which is incorporated herein by reference.

BACKGROUND ART

Recently, portable telephones have been equipped with multiple functions and are often used as small-sized computers. For example, one example of the functions installed in portable telephones is a data communication function, accompanied with a function of a display device for reading received data such as books, magazines, and newspapers. In the situation in which electronic devices have been frequently used as display devices, there is a demand for further improving electronic devices in terms of usability and visibility.

Patent Document 1 discloses a technology for improving usability and visibility of images displayed on electronic devices. Specifically, Patent Document 1 discloses a portable electronic device equipped with two display screens, which can be opened or closed in a mutual folding direction. A touch panel is attached to the surface of one display screen so as to input an operator command upon being depressed with a finger or a stylus pen, thus performing a process in response to the operator command. For example, it is possible to perform a process in which upon inputting a command to select a certain tab, data displayed on one display screen is transferred to and displayed on the other display screen.

PRIOR ART DOCUMENT

Patent Document

Patent Document 1: Pamphlet of International Publication WO2005/091117

DISCLOSURE OF INVENTION

Problem to be Solved by the Invention

However, the above technology disclosed in Patent Document 1 has a problem owing to low usability because it performs a process to move a display position of data in response to an operation "of depressing a certain tab". That is, the user needs to perform an operation of depressing a certain tab in order to display data in another display screen, wherein the user's motion to perform such an operation does not agree with the movement of data toward another display area; hence, the user may have a sensation of congruity in operation so that the user suffers from a problem owing to low usability.

It is an object of the present invention to improve the usability of data displayed on an information processing device.

Means to Solve the Problem

The present invention seeks to solve the above problem, wherein an information processing device of the present invention is configured of a plurality of display screens, a display control means that controls a display operation on each of display screens, a touch panel attached to the surface of at least one display screen, and an operation reception unit that receives a depression input externally applied to the touch panel with a pressing means, and wherein when the operation reception means receives a slide operation sliding the pressing means on the touch panel, the display control means moves and displays display data of one display screen having the touch panel on another display screen.

In the information processing device, when the operation reception means receives a slide operation on the touch panel from one display screen having the touch panel to another display screen, the display control means moves and displays display data of one display screen on another display screen.

In the information processing device, a touch panel is attached to the surface of another display screen, wherein the operation reception means receives a slide operation on the touch panel from one display screen to another display screen, the display control means moves and displays display data of one display screen on another display screen.

In the information processing device, when the operation reception means receives a slide operation on a predetermined region of display data of one display screen having the touch panel toward another display screen, the display control means moves and displays display data of one display screen on another display screen.

The information processing device further includes a position detection means that detects a position of the information processing device, wherein when the operation reception means receives a slide operation on condition that the position detection means detects a predetermined position of the information processing device, the display control means moves and displays display data of one display screen on another display screen.

In the information processing device, the position detection means further includes an opening detection means that detects an opening between one display screen and another display screen which are engaged in a free open/close manner, wherein when the operation reception means receives a slide operation on condition that the opening detection means detects a predetermined angle of opening between one display screen and another display screen, the display control means moves and displays display data of one display screen on another display screen.

In the information processing device, when the operation reception means receives a slide operation on condition that the opening detection means detects an opened state in which one display screen and another display screen are opened and placed on the same plane, the display control means moves and displays display data of one display screen on another display screen.

In the information processing device, the position detection means further includes a direction detection means that detects a direction of the display screens, wherein when the operation reception means receives a slide operation on condition that the direction detection means detects a predetermined direction of the display screens, the display control means moves and displays display data of one display screen on another display screen.

In the information processing device, one display screen and another display screen are engaged to adjoin in a simultaneously readable manner, wherein when the operation reception means receives a slide operation on condition that the direction detection means detects a vertical position of the display screens in a gravitational direction, the display control means moves and displays display data of one display screen on another display screen.

In the information processing device, when the operation reception means receives a slide operation on condition that the opening detection means detects an opened state in which one display screen and another display screen are opened and placed on the same plane and on condition that the direction detection means detects a vertical position of the display screens in a gravitational direction, the display control means moves and displays display data of one display screen on another display screen.

In the information processing device, when the operation reception means receives a slide operation on condition that display data disposed in an uppermost layer, within a plurality of display data layered and overlapped on one display screen, is displayed, the display control means moves and displays display data of the uppermost layer of one display screen on another display screen.

The information processing device further includes a data processing means which receives a predetermined operator command with respect to display data on one display screen and which performs processing based on the content of display data on one display screen and the content of the operator command received by the operation reception means, wherein the display control means displays data representing the processing result of the data processing means on another display screen instead of one display screen.

In the information processing device, the data processing means accesses a data storage area suited to the content of the operator command so as to fetch data corresponding to display data on one display screen, wherein the display control means displays the data fetched by the data processing means on another display screen.

An information processing program of the present invention is adapted to an information processing device including a plurality of display screens and a touch panel attached to the surface of at least one display screen, thus achieving a step of controlling a display operation with respect to each of the display screen, a step of receiving a depression input externally applied to the touch panel by a predetermined pressing means, and a step of, upon receiving a slide operation sliding the pressing means on the touch panel, moving and displaying display data of one display screen having the touch panel on another display screen.

The information processing program further includes a step of moving and displaying display data of one display screen on another display screen upon receiving a slide operation from one display screen having the touch panel to another display screen.

A display control method of the present invention includes an operation reception process that receives a depression input externally applied to a touch panel attached to the surface of at least one of a plurality of display screens by a predetermined pressing means, and a display control process that controls a display operation with respect to each of display screens in response to the depression input received by the operation reception process, wherein when the operation reception process receives a slide operation sliding the predetermined pressing means on the touch panel, the display control process moves and displays display data of one display screen having the touch panel on another display screen.

In the display control method, when the operation reception means receives a slide operation on the touch panel from one display screen to another display screen, the display control process moves and displays display data of one display screen on another display screen.

In the display control method, when the operation reception process receives a slide operation on condition that the display control process detects a predetermined position of an information processing device, the display control process moves and displays display data of one display screen on another display screen.

Effect of the Invention

The present invention is able to improve usability with respect to data displayed on an information processing device.

Specifically, the information processing device displays predetermined display data on an installed display screen. When a user performs a slide operation sliding a finger or a stylus pen on a touch panel attached to the surface of one display screen, the information processing device moves and displays display data of one display screen on another display screen. In particularly, upon receiving a slide operation sliding a finger or a stylus pen from one display screen to another display screen or across one display screen and another display screen, the information processing device moves display data of one display screen to another display screen. Since display data is moved toward another display screen in response to a user's slide operation on the touch panel, the user's sensation of manipulation agrees with the movement of data, allowing the user to manipulate the device without undergoing a sensation of congruity. Therefore, it is possible to improve usability in handling a display of the information processing device.

The information processing apparatus of the present invention is able to move and display the display data on another display screen in response to the slide operation when the device is disposed at a predetermined position defined by a direction and an opening of a pair of display screens which can be freely opened or closed. Thus, it is possible to suppress display data from being unnecessarily moved, thus further improving usability.

MODES FOR CARRYING OUT THE INVENTION

Hereinafter, the present invention will be described with reference to specific embodiments. Persons skilled in the art may adopt a variety of different embodiments based on the description of the present invention; hence, the present invention is not necessarily limited to the embodiments which are illustrated for the sake of description.

(First Embodiment)

Figure 1:
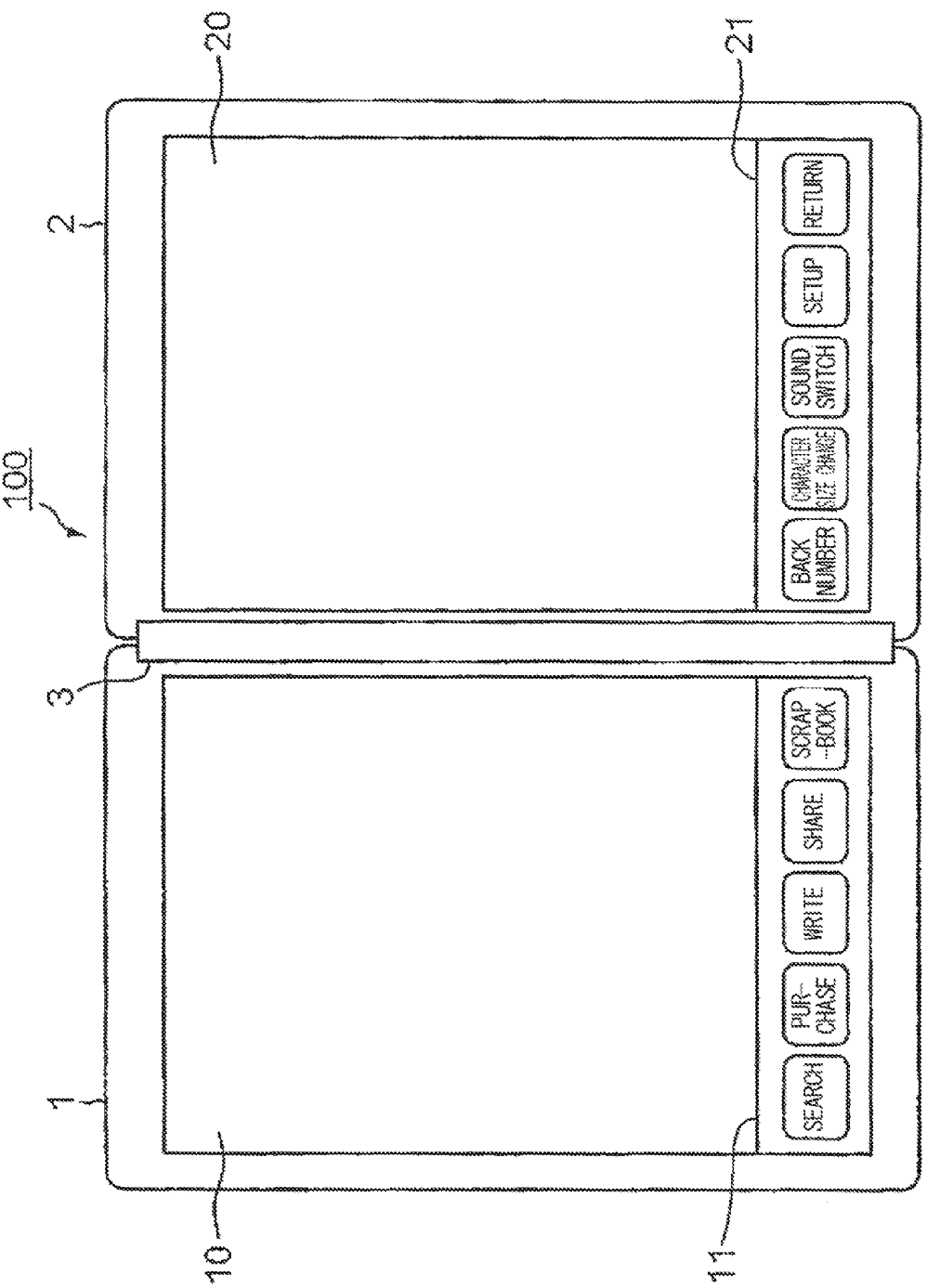
[FIG. 1] A drawing showing an external configuration of an information processing terminal according to a first embodiment.
Figure 2:
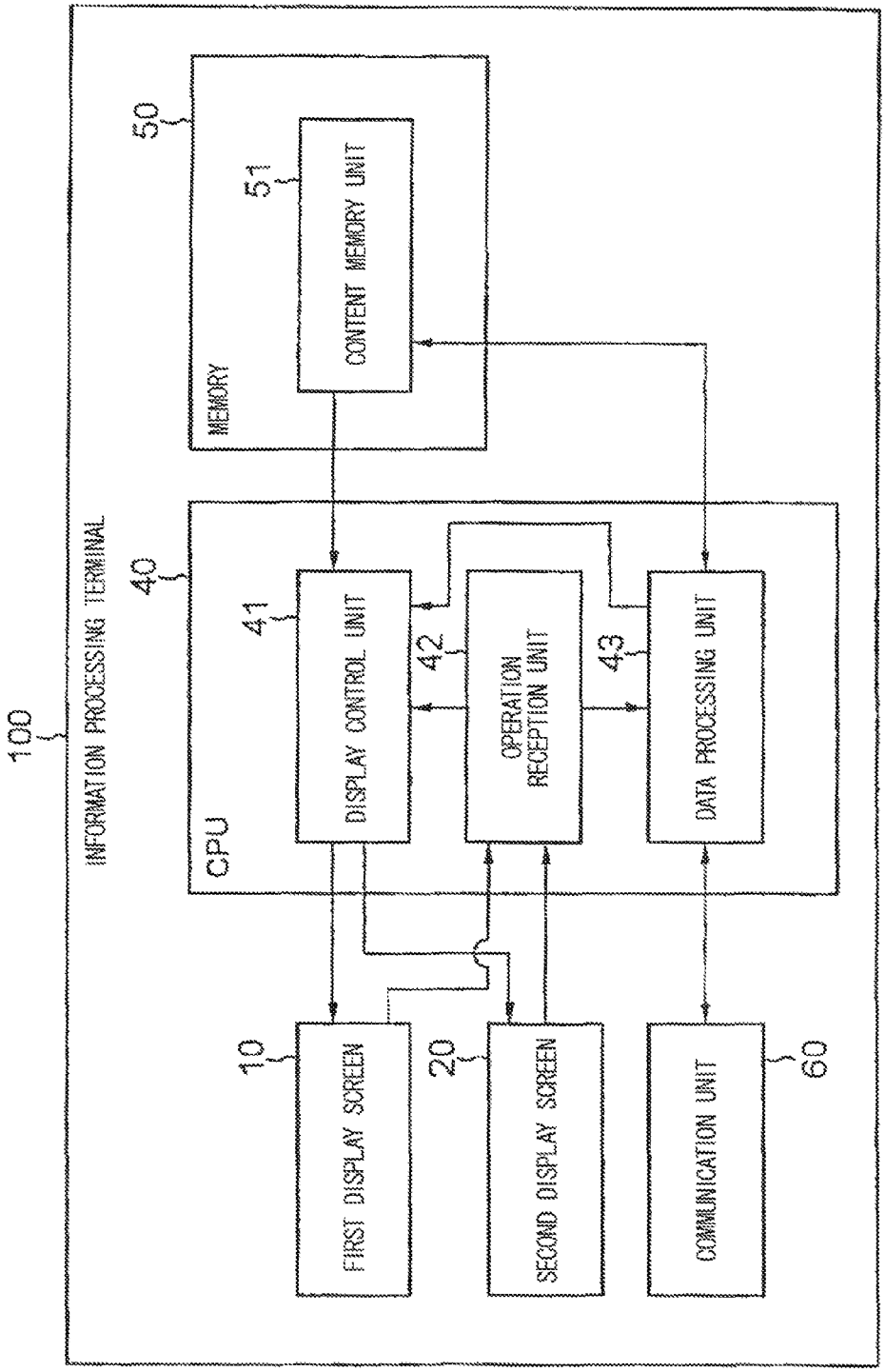
[FIG. 2] A block diagram showing a configuration of the information processing terminal shown in FIG. 1.
Figure 8:
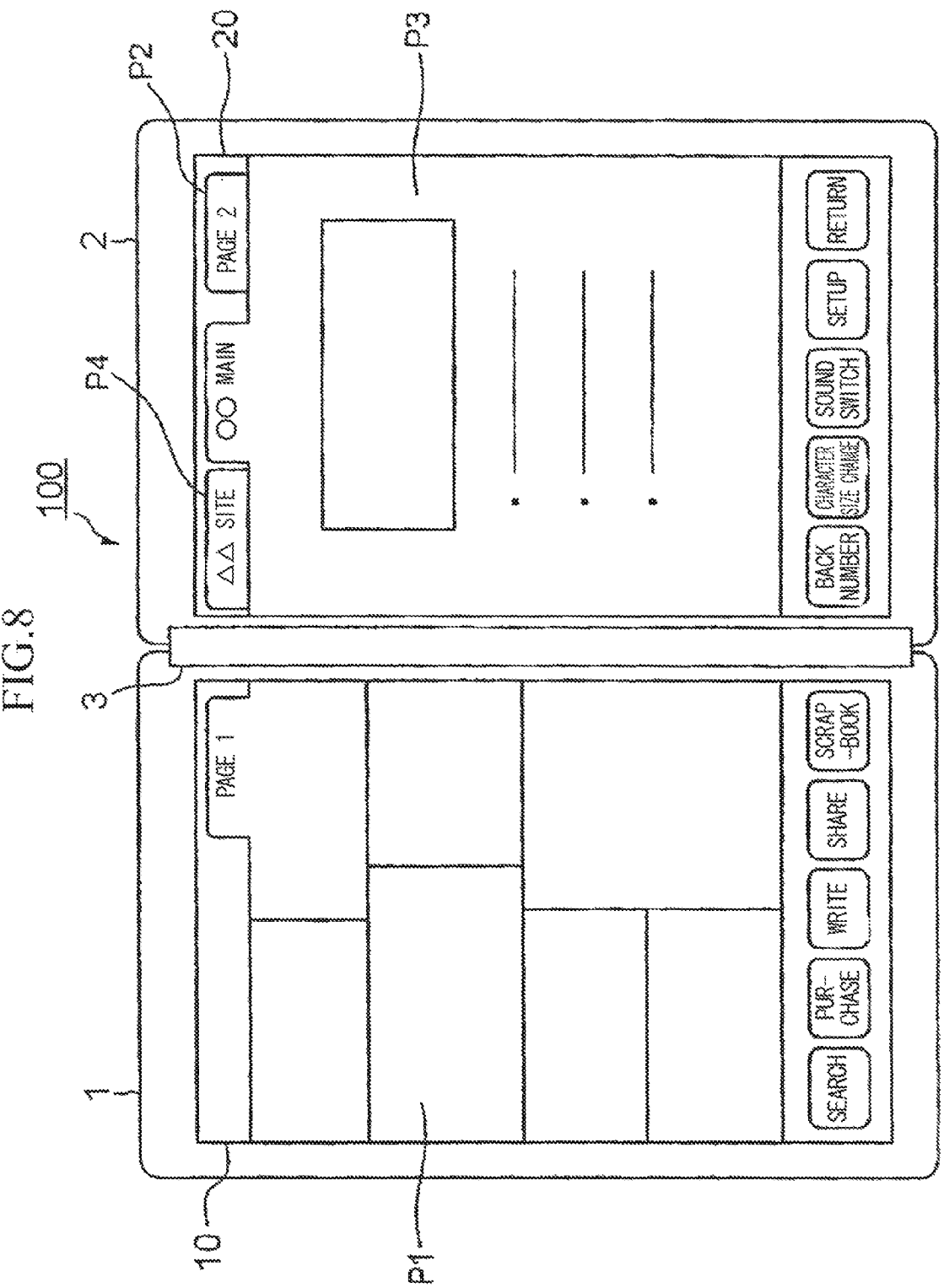
[FIG. 8] A drawing showing an operation and a display manner of the information processing terminal shown in FIG. 1.
Figure 9:
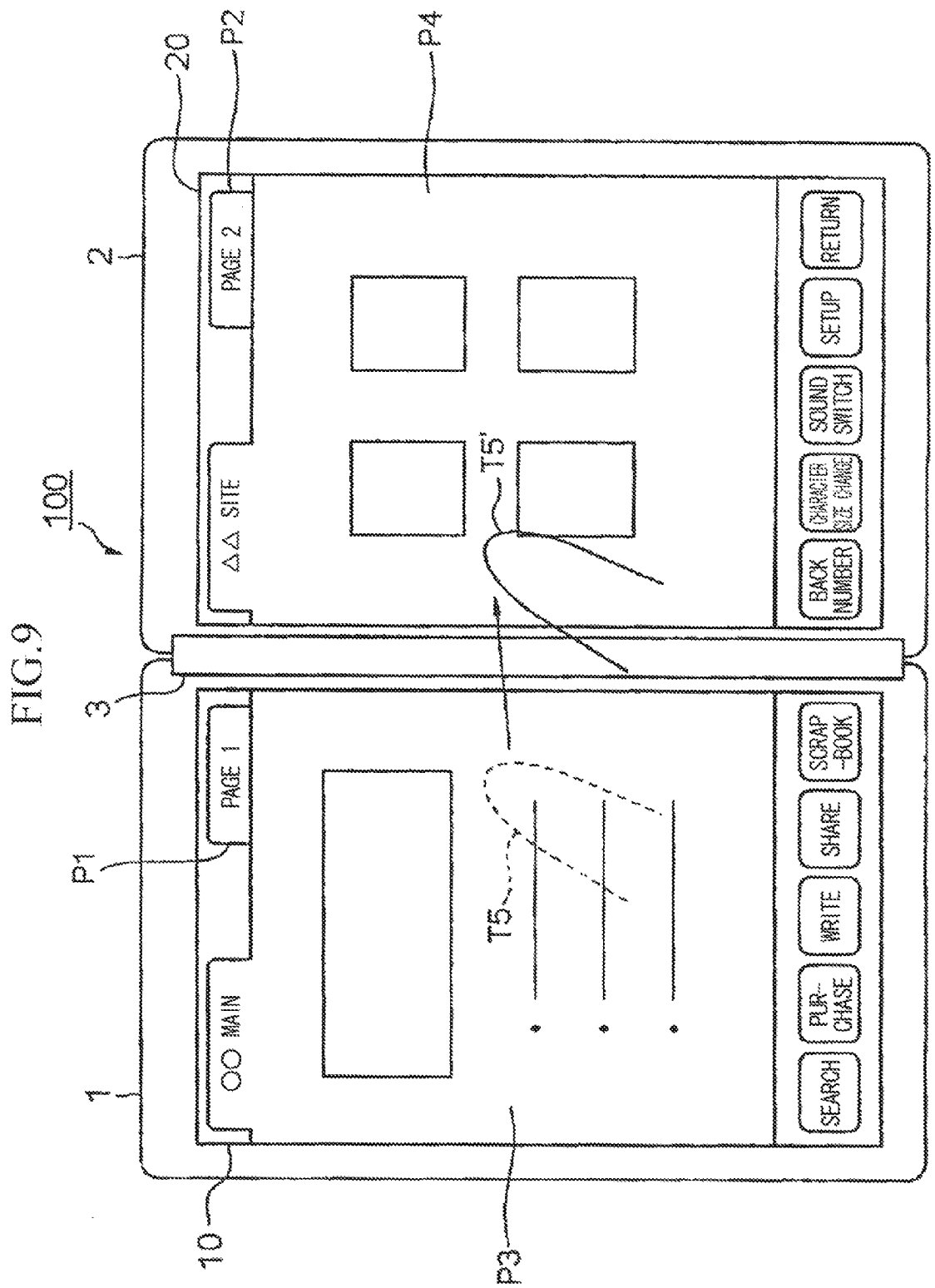
[FIG. 9] A drawing showing an operation and a display manner of the information processing terminal shown in FIG. 1.
Figure 10:
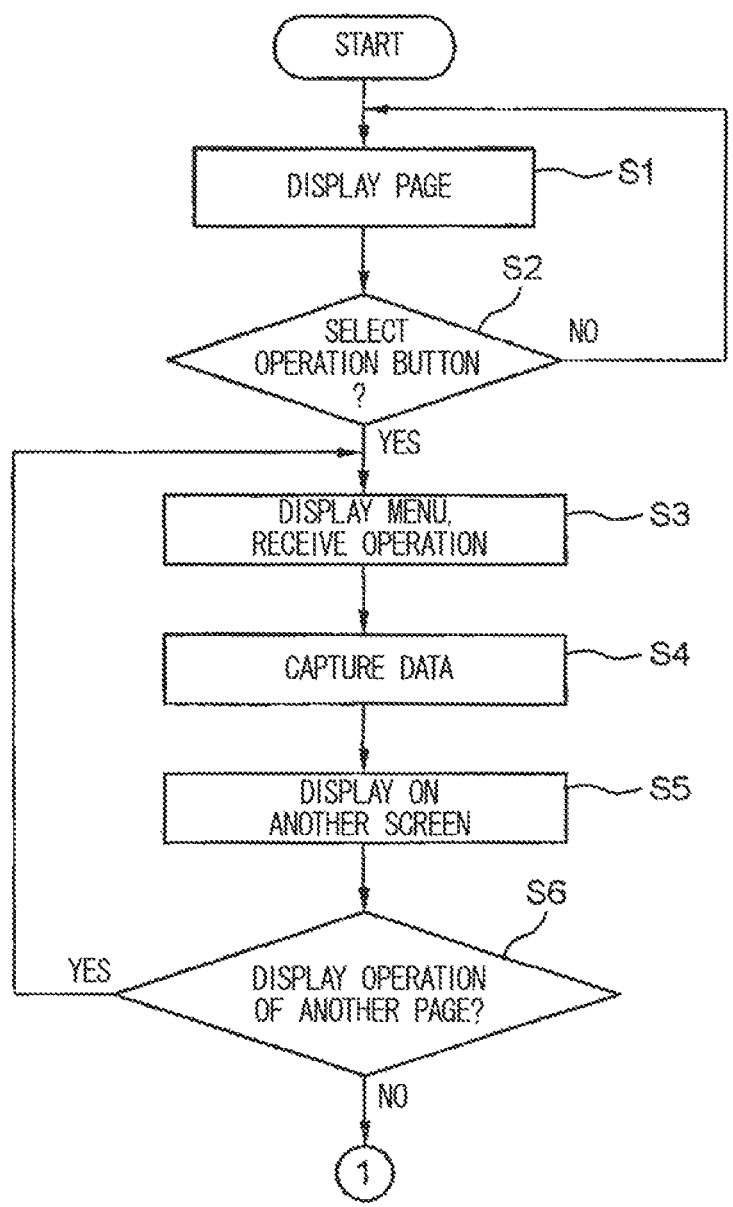
[FIG. 10] A flowchart showing the operation of the information processing terminal shown in FIG. 1.
Figure 11:
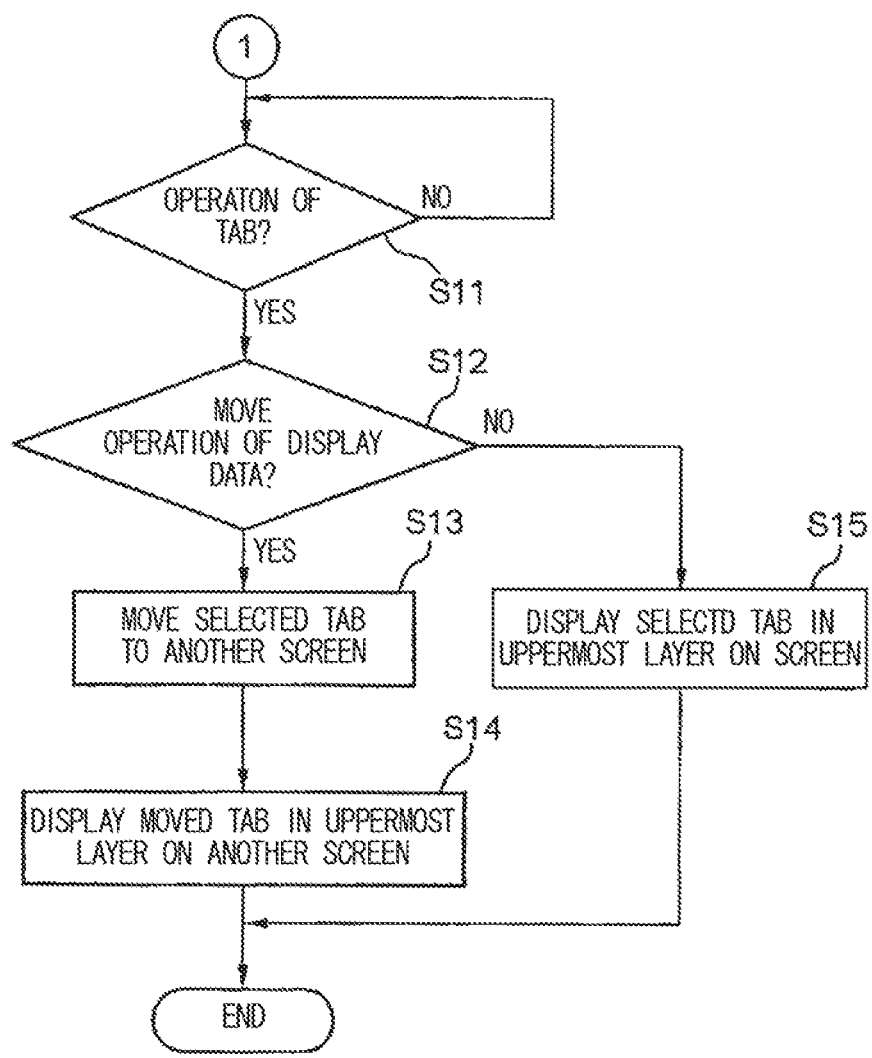
[FIG. 11] A flowchart showing the operation of the information processing terminal shown in FIG. 1.

A first embodiment of the present invention will be described with reference to FIGS. 1 to 11. FIG. 1 is a drawing showing an external configuration of an information processing terminal according to the present embodiment; and FIG. 2 is a functional block diagram showing a configuration of the information processing terminal. FIGS. 3 to 9 are drawings showing an operation and a display manner of the information processing terminal. FIGS. 10 and 11 are flowcharts showing the operation of the information processing terminal.

(Configuration)

An information processing terminal 100 (or an information processing device) of the present embodiment is a folding-type information processing terminal in which a first unit 1 and a second unit 2 are mutually interconnected via a hinge 3 such that they can be freely opened or closed. The first unit 1 is equipped with a first display screen 10 whilst the second unit 2 is equipped with a second display screen 20. Therefore, in an unused condition of the information processing terminal 100, a user can fold the first unit 1 and the second unit 2 together while placing the first display screen 10 and the second display screen 20 inwardly. In a used condition, a user can simultaneously read both the display screens 10 and 20 while opening the first unit I and the second unit 2. The first display screen 10 and the second display screen 20 are each equipped with a touch panel on the surface so that they can accept a depression input (or a touch input) with an external pressing means such as a finger or a stylus pen.

As shown in FIG. 2, a CPU 40 serving as an arithmetic unit, a memory 50 serving as a storage unit, and a communication unit enabling wireless communication are installed inside the information processing terminal 100. That is, the information processing terminal 100 has a basic configuration as a computer. Specifically, the CPU 40 includes a display control unit 41, an operation reception unit 42, and a data processing unit 43, which are configured upon loading a program into the CPU 40. The memory 50 includes a content memory unit. The constituent elements will be described in detail as follows.

The above display control unit 41 (or a display control means) has a basic function for controlling operations of the display screens 10 and 20. That is, the display control unit 41 reads content data stored in the content memory unit 51 of the memory 50 so as to display them in main display areas largely covering the first display screen 10 and the second display screen 20. A plurality of operation buttons is displayed in operation button display areas 11 and 21 which are formed in the lower portions of the display screens 10 and 20.

The display control unit 41 displays the processing result of the data processing unit 43 in accordance with the content of display data and an operator command of a user U received by the operation reception unit 42. When the data processing unit 43 performs processing based on display data displayed on one display screen, the display control unit 41 displays the processing result on the other display screen.

Upon inputting a slide operation when a finger or a stylus pen is being slid on touch panels of the display screens 10 and 20, display data of one display screen is transferred to and displayed on the other display screen. The detailed function of the display control unit 41 will be described later.

The operation reception unit 42 (or an operation reception means) has a basic function of receiving an operation input by the user U with a pressing means applied to a touch panel. In particular, the information processing terminal 1 of the present embodiment receives a touch input applied to each of the touch panels of the display screens 10 and 20 as a user's operation input. For example, when the user touches (or depresses) an information display region (e.g. a link to another web site) which can be selected within display data displayed on each of the display screens 10 and 20, the operation reception unit 42 receives an operator command for selecting the information display region. When the user touches (or depresses) one of operation buttons displayed in the operation button display areas 11 and 21 of the display screens 10 and 20, the operation reception unit 42 receives an operator command corresponding to the touched operation button as an operator command applied to display data displayed on the display screens 10 and 20.

Figure 4:
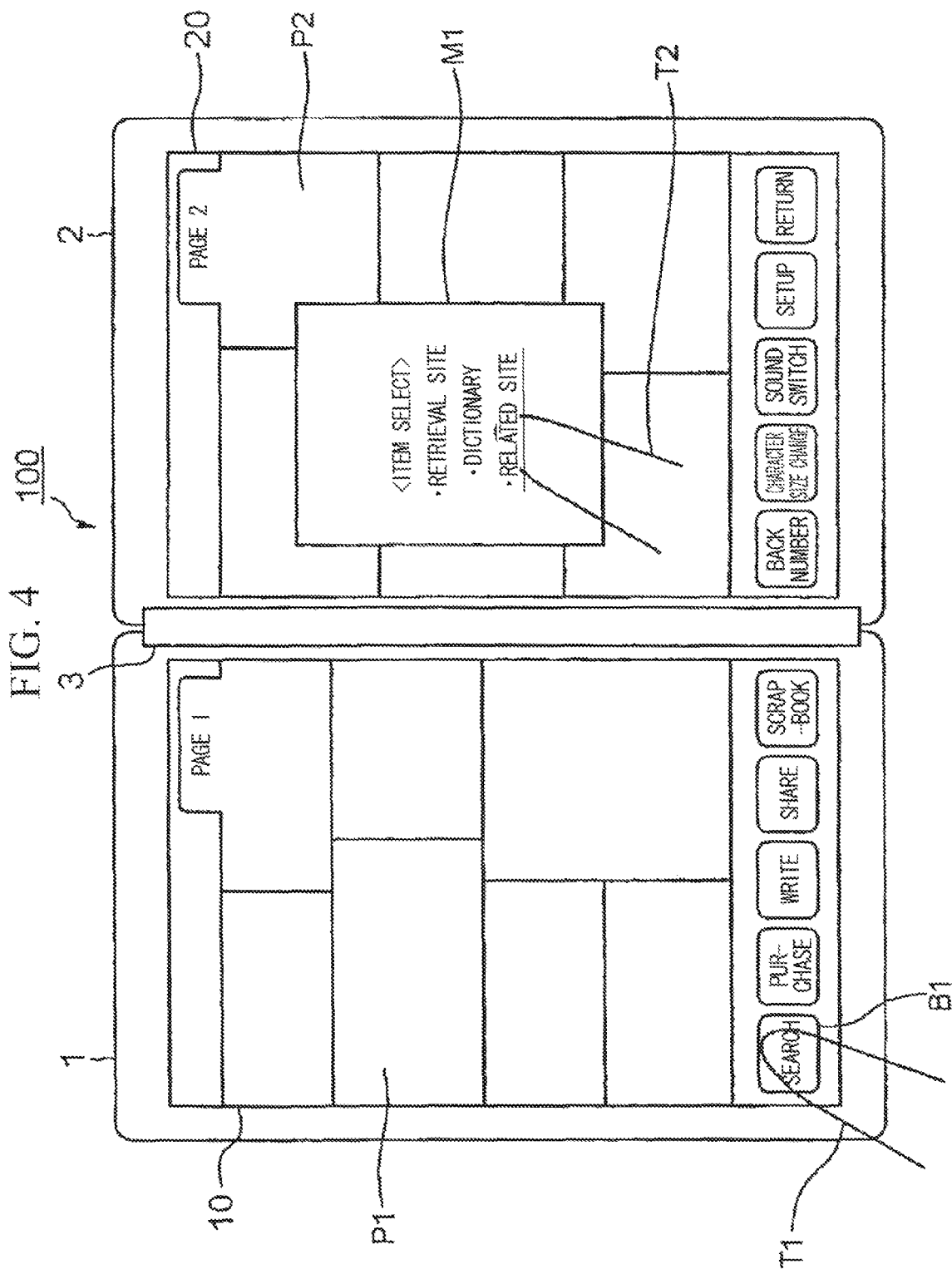
[FIG. 4] A drawing showing an operation and a display manner of the information processing terminal shown in FIG. 1.

When a detailed operation is set to each of the operator commands corresponding to operation buttons which are selected by the user, a menu allowing the user to select operation items per each operator command is displayed on the display screens 10 and 20 (see a reference numeral M1 in FIG. 4). The operation reception unit 42 has a function of receiving an operator command, which corresponds to an operation item the user touches on the menu, as an operator command applied to display data displayed on the display screens 10 and 20.

The operation reception unit 42 displays operation buttons and operation items such as buttons and items whose types are determined in advance in connection with types of display data displayed on the display screens 10 and 20.

Types of display data can be specified with reference to the information which is stored in advance in a specific region or a specific format within display data.

Upon receiving a user's operator command with the operation reception unit 42, the data processing unit 43 (or a data processing means) performs processing based on the content of display data and the content of the received operator command, thus outputting the processing result to the display control unit 41. For example, it performs retrieval processing based on the content of display data, or it accesses a web site related to display data so as to capture data from the web site. The display control unit 41 displays the processing result of the data processing unit 43 on the display screen.

The functions of the display control unit 41, the operation reception unit 42, and the data processing unit 43 will be described in detail with reference to FIGS. 3 to 9.

In an initial state, operation buttons shown in FIG. 2 are displayed in the operation button display areas 11 and 21. When a user performs a reading operation on electronic contents such as animated cartoons, for example, the operation reception unit 42 receives the reading operation. As shown in FIG. 2, the data processing unit 43 and the display control unit 41 displays page data of animated cartoons on the display screens 10 and 20. In an example of FIG. 2, "PAGE 1" of P1 is displayed on the first display screen 10 whilst "PAGE 2" of P2 is displayed on the second display screen 20.

When the information processing terminal 100 has already inputted animated data and stored them in the content memory unit 51, for example, it reads and displays animated data from the content memory unit 51. Alternatively, when animated data are accessible and available via a certain web site on the Internet, it captures and displays animated data from a certain web site by means of the communication unit 60.

When a user performs a certain operation on display data (or animated data) displayed on the first display screen 10, the user selects operation buttons in the operation button display areas 11 and 21 on the condition that targeted display data are being displayed. For example, FIG. 4 shows a case in which a user is searching into "animated cartoons" displayed on the display screens 10 and 20. In this case, the user touches and selects a "SEARCH" button B1 (see reference numeral T1) so that the operation reception unit 42 receives a user's selection. Subsequently, the operation reception unit 42 and the display control unit 41 displays a menu M1 displaying detailed operation items in conformity with the operation content of "SEARCH". Thus, the user touches and selects a detailed operation item (see reference numeral T2), the operation reception unit 42 receives a user's selection of the detailed operation item.

The data processing unit 43 performs processing based on the content of "animated data" and the content of the detailed operation item selected by the user. In this case, the user selects "RELATED SITE" as the content of the detailed operation item, so that the data processing unit 43 accesses a "OO SITE" serving as a main web site of "animated data" corresponding to the displayed content of a book via the communication unit 60, thus capturing web page data. For example, the data processing unit 43 searches for a main web site of the corresponding "animated cartoons" on the Internet with respect to title data of "animated cartoons" included in "animated data" being displayed, thus accessing the "OO SITE". Alternatively, the data processing unit 43 reads the address information (URL) of the "OO SITE" already included in "animated data", thus accessing the corresponding address destination.

Figure 5:
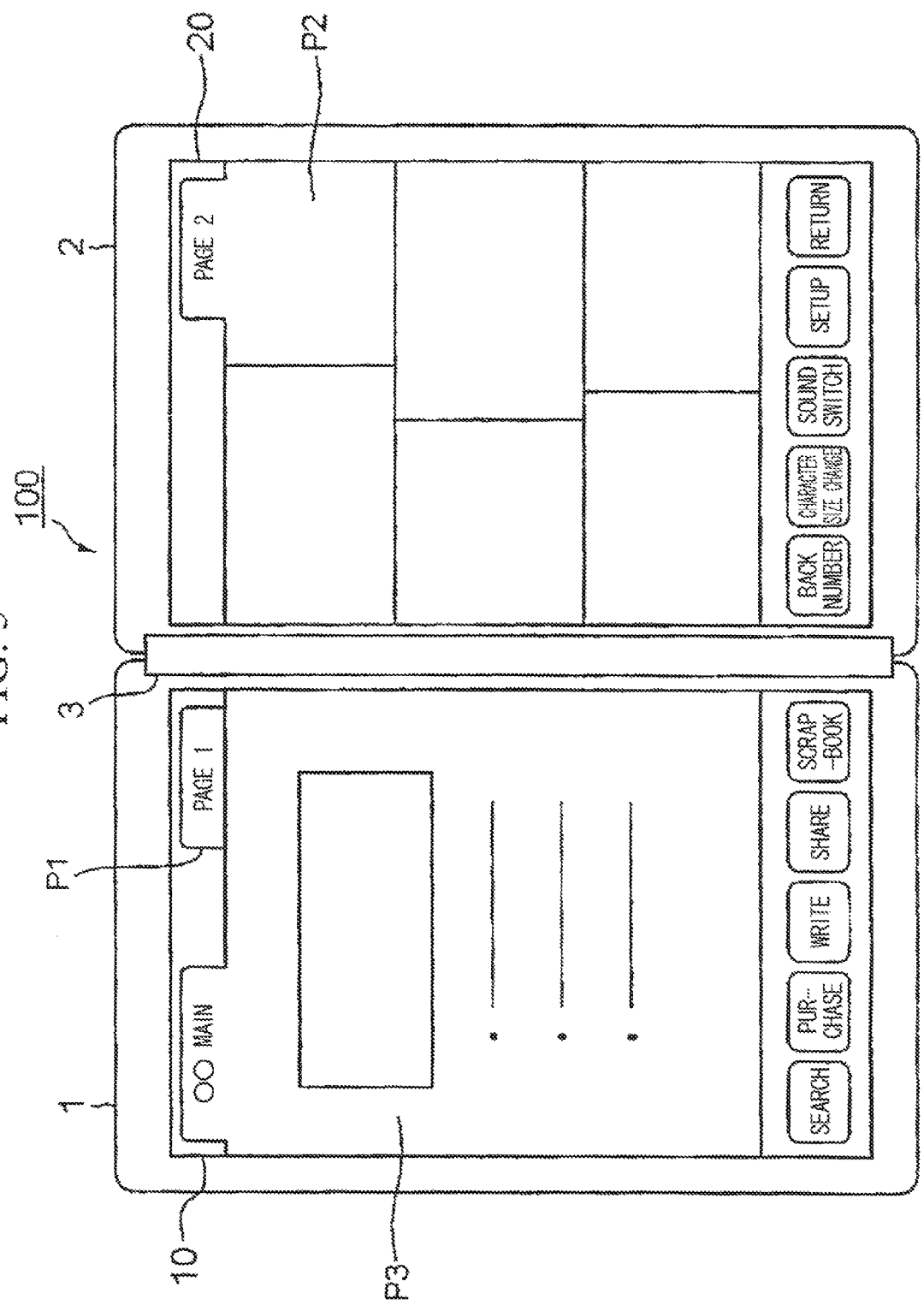
[FIG. 5] A drawing showing an operation and a display manner of the information processing terminal shown in FIG. 1.

Thereafter, as shown in FIG. 5, the display control unit 41 displays "OO MAIN" of P3, representing captured page data of the main web site, on the first display screen 10. The display control unit 41 is able to render layers of display data being overlapped on the display screens 10 and 20. In actuality, only the uppermost layer of display data is displayed on the display screens 10 and 20. At this time, the display control unit 41 outputs and displays "PAGE TITLE" specifying each display data on a tab disposed in the upper portion of each display data. Thus, the user can recognize what page is being overlapped. In an example of FIG. 5, "OO MAIN" of P3 is displayed over "PAGE 1" of P1 already displayed on the first display screen 10, i.e. the uppermost layer of the first display screen 10. Therefore, only the tab of the under-layered "PAGE 1" of P1 indicating "PAGE TITLE" is displayed in the upper section. In an example of FIG. 3 in which display data are not overlapped, the display control unit 41 does not necessarily display a tap indicating "PAGE TITLE". That is, it can display tabs of display data in the upper section only when a plurality of display data is overlapped and displayed on the same display screen.

The above is the case for capturing "OO MAIN" of P3 from a certain web site, whereas it is possible to capture the target information from certain data storage areas stored in servers on the other network. Alternatively, it is possible to retrieve the target information from the stored information of the information processing terminal 100.

Figure 6:
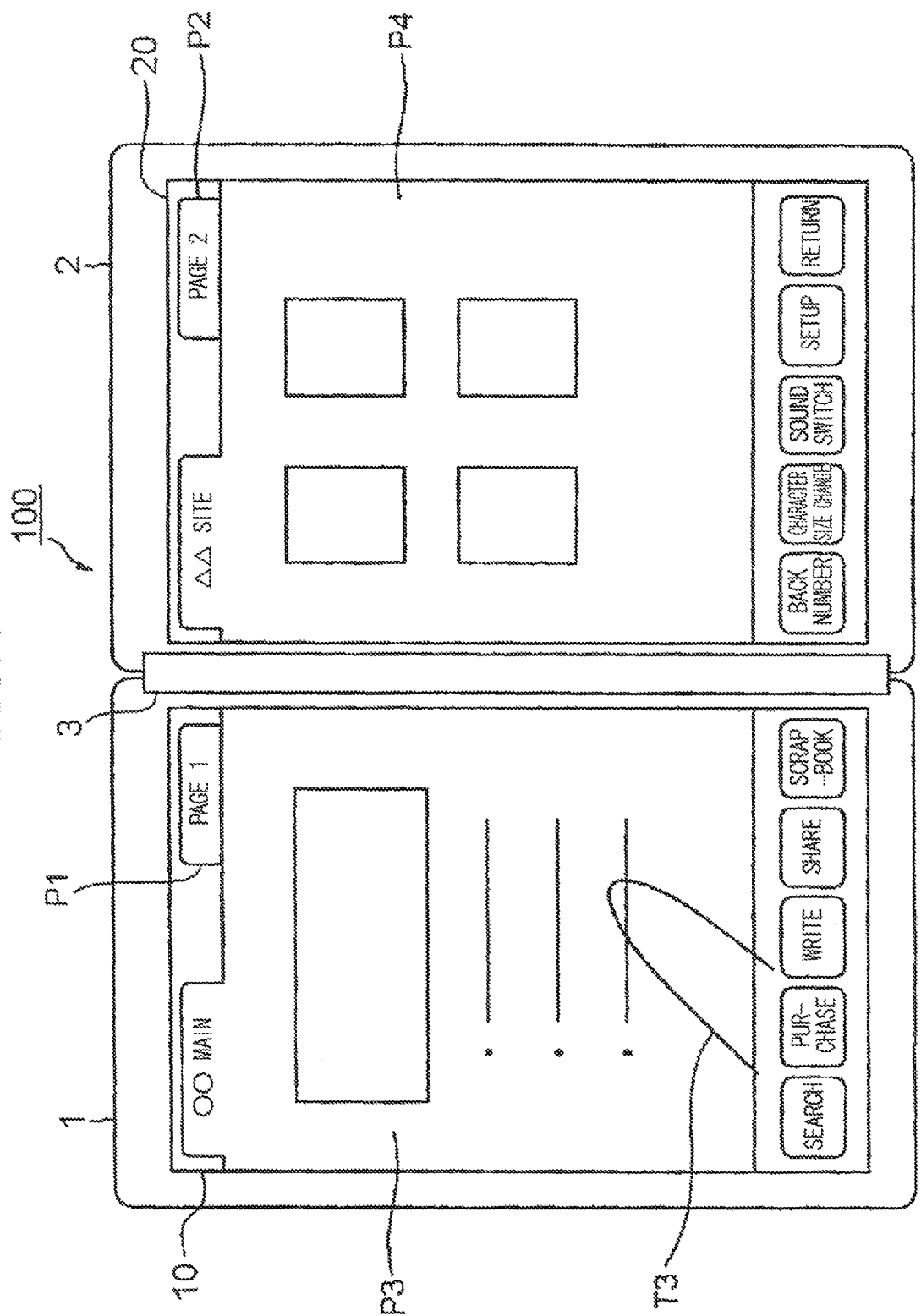
[FIG. 6] A drawing showing an operation and a display manner of the information processing terminal shown in FIG. 1.

When a user performs a certain operation on "OO MAIN" of P3 representing display data displayed on the first display screen 10, the operation reception unit 42 receives the operation on the information displayed on the "OO MAIN" of P3. As shown in FIG. 6, for example, when a user selects a link (i.e. the presentation of the address information toward another web site) displayed on the "OO MAIN" of P3 with a finger or a stylus pen (see reference numeral T3), the operation reception unit 42 receives a user's selection of the link. The data processing unit 43 reads the address information (URL) of a link destination embedded in the selected link, thus accessing an address destination of a web site. That is, it accesses "ΔΔ SITE" of the link destination so as to capture display data thereof. Subsequently, as shown in FIG. 6, the display control unit 41 displays the captured "ΔΔ SITE" of P4 on the second display screen 20.

At this time, the data processing unit 43 displays the captured "ΔΔ SITE" of P4 on the second display screen 20 instead of the first display screen 10 which displays "OO MAIN" of P3 embedding the address information for accessing the corresponding site. In addition, as shown in FIG. 6, it displays "ΔΔ SITE" of P4 over "PAGE 2" of P2 already displayed on the second display screen 20, i.e. in the uppermost layer of the second display screen 20. Thus, only the tab of the under-layered "PAGE 2" of P2 indicating "PAGE TITLE" is displayed in the upper section.

The information processing terminal 100 performs processing in response to any types of operator commands being input thereto, thus displaying the processing result on a display screen. Upon inputting an operator command for retrieving related data of "OO MAIN" of P3 displayed on the first display screen 10, for example, it captures the retrieval result from a retrieval site on a network, thus displaying data representing the retrieval result on the second display screen 20. As described above, the information processing terminal 100 has a function of displaying the result of processing on data displayed on one display screen on the other display screen.

Figure 7:
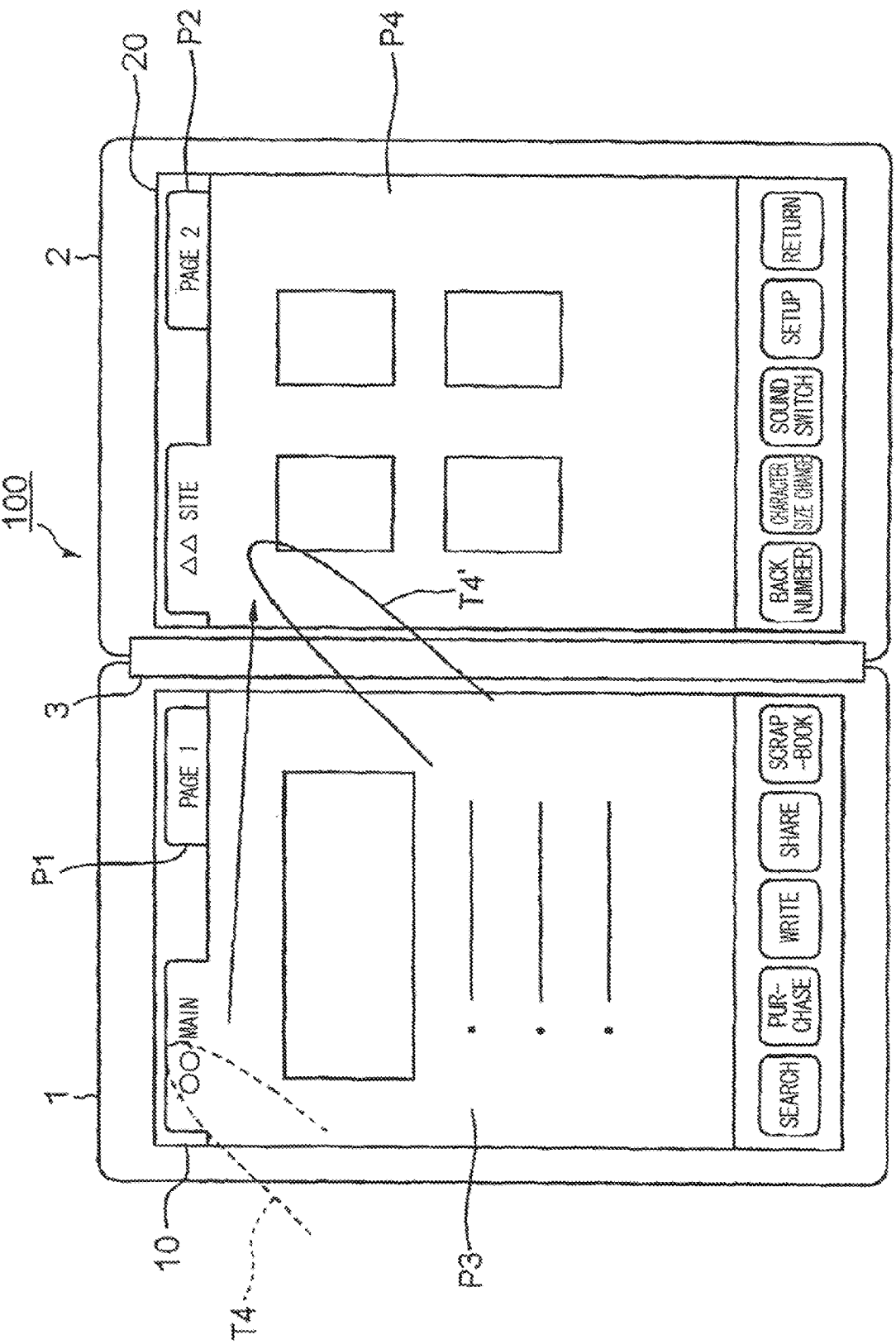
[FIG. 7] A drawing showing an operation and a display manner of the information processing terminal shown in FIG. 1.

In order to read "PAGE 1" of P2 disposed under "OO MAIN" of P3 displayed on the first display 10, a user performs an operation to move the uppermost layer of "OO MAIN" of P3. At this time, the user touches a tab of "OO MAIN" of P3, which is a moved subject displayed on the first display screen 10, with a pressing means such a finger or a stylus pen and performs a slide operation for sliding the touched tab toward the second display screen 20, which is a destination of movement, with a finger or a stylus pen (see reference numerals T4 and T4'). As shown in FIG. 7, the user drags the tab of display data P3 displayed on the first display screen 10 toward the second display screen 20. Thus, the operation reception unit 42 receives the slide operation.

When the information processing terminal 100 detects a touch and slide operation on the tab of display data (i.e. a preset display area), the display control unit 41 moves and displays display data of "OO MAIN" of P3 corresponding to the touched tab on the second display screen 20. As shown in FIG. 8, it displays "OO MAIN" of P3 over "ΔΔ SITE" of P4 already displayed on the second display screen 20, i.e. in the uppermost layer of the second display screen 20. Therefore, only the tabs of the under-layered "ΔΔ SITE" of P4 and "PAGE 2" of P2 indicating their "PAGE TITLE" are displayed in the upper section.

An operation method for moving display data is not limited to the above operation method. The above operation method illustrates that a user performs a touch and slide operation on the tab of the moved display data; but this is not a restriction. For example, display data can be moved to another display screen upon a touch and slide operation on another preset display area instead of the tab of display data.

Alternatively, a user touches an arbitrary point on the "OO MAIN" of P3, which is a moved subject displayed on the first display screen 10, with a finger or a stylus pen and performs a slide operation to slide it toward the second display screen 20, which is a destination of movement (see reference numeral T5 and T5'), so that the operation reception unit 42 receives the slide operation. Upon detecting the touch and slide operation on the "OO MAIN" of P3, as shown in FIG. 8, the display control unit 41 moves and displays display data of the "OO MAIN" of P3, corresponding to the touched tab, on the second display screen 20.

The slide operation is not necessarily continued toward another display screen which is a destination of movement of display data. Upon detecting a slide operation on display data, which is a moved subject, in a direction toward another display screen which is a destination of movement, for example, the information processing terminal 100 can perform processing to move display data toward another display screen.

In addition, the slide operation does not necessarily slide a moved subject in a direction toward another display screen which is a destination of movement. Upon detecting a slide operation on display data, which is a moved subject, in an arbitrary direction with a finger or a stylus pen, the information processing terminal 100 can perform processing to move display data toward another display screen.

(Operation)

Figure 3:
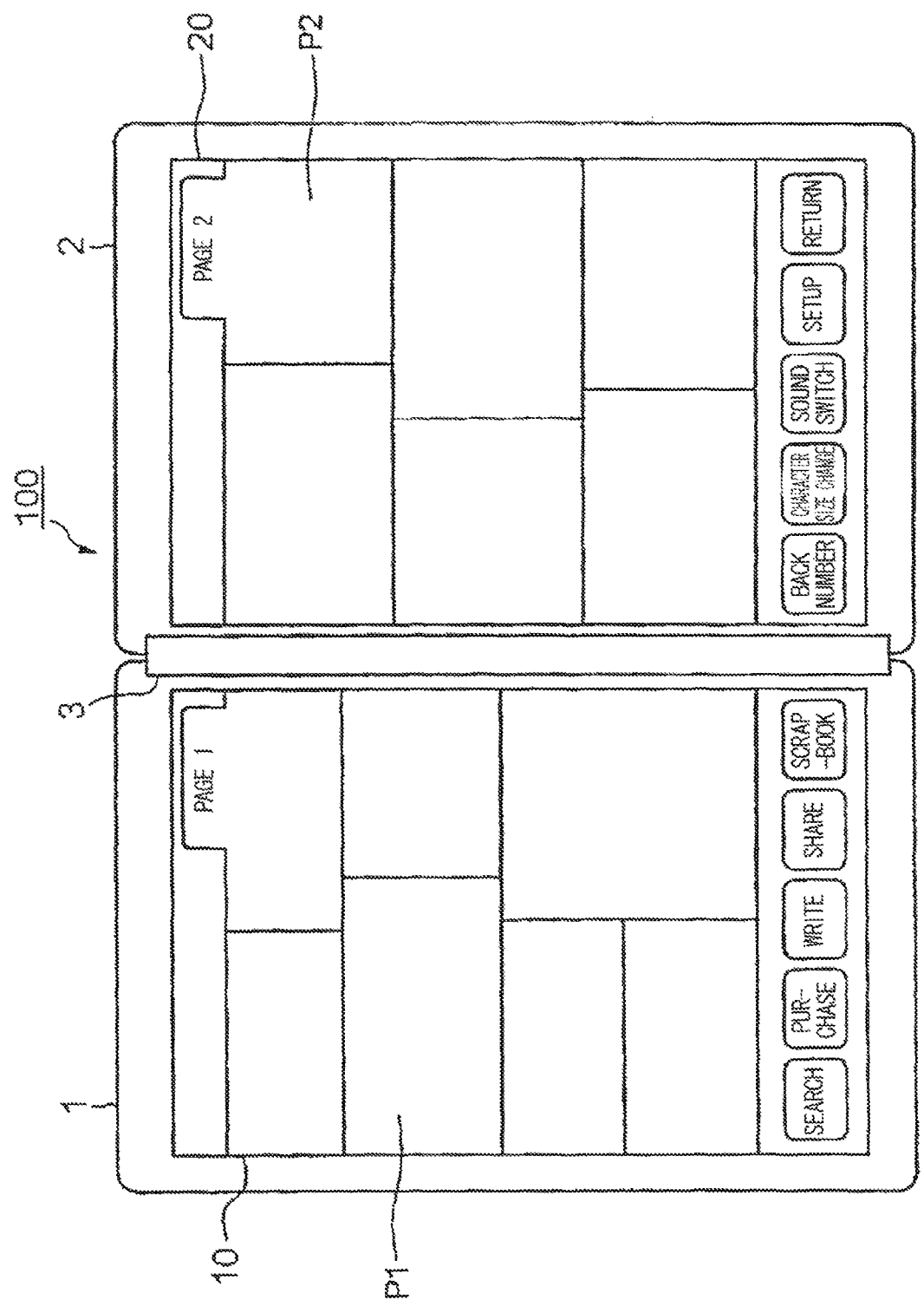
[FIG. 3] A drawing showing an operation and a display manner of the information processing terminal shown in FIG. 1.

Next, the operation of the information processing terminal 100 having the above configuration will be described with reference to flowcharts of FIGS. 10 and 11. First, a user selects a displayed content with the information processing terminal 100. Subsequently, the information processing terminal 100 displays a selected content of a newspaper, a magazine, and a book such as an animated cartoon on the display screens 10 and 20 in units of pages (step S1). For example, as shown in FIG. 3, it collectively displays two pages at once such that "PAGE 1" of P1 is displayed on the first display screen 10 whilst "PAGE 2" of P2 is displayed on the second display screen 20.

In order to perform a certain operation on a page (i.e. display data) displayed on a display screen, a user touches and selects an operation button in the operation button display areas 11 and 21 (i.e. YES of step S2). At this time, when the detailed operation content is prepared in advance, a menu setting up detailed operation items is displayed so as to receive a user's selection of a certain operation item in the menu (step S3).

The information processing terminal 100 captures data, which is suited to the displayed content of display data and the received content of a selected operation item, from a related web server or a storage unit (step S4). Subsequently, it displays data captured from a web site such as data of a web site relating to the content (e.g. an animated cartoon), a retrieval result, a purchase screen, and a bulletin board (step S5).

When a user touches "SEARCH" button B1 in the operation button display areas 11 and 12 shown in FIG. 4 (see reference numeral T1), for example, a menu M1 of "ITEM SELECT" is displayed on the second display screen 20. When the user touches "RELATED SITE" (see reference numeral T2), a web site of "OO MAIN", which is a related site of the animated cartoon, is accessed so that display data thereof is captured and displayed in the uppermost layer of the first display screen 10 as shown in FIG. 5.

In addition, the user may perform an operation to display another page (i.e. YES of step S6). For example, when the user touches and selects a link disposed on the "OO MAIN" of P3 displayed on the first display screen 10 as shown in FIG. 6 (see reference numeral T3), a web site corresponding to a link destination is accessed so that the corresponding data is captured (steps S3 and S4). Subsequently, the captured "ΔΔ SITE" of P4 is displayed on the second display screen 20 instead of the first display screen 10 displaying the "OO MAIN" of P3 which is manipulated in order to access the "ΔΔ SITE" of P4 (step S5).

Subsequently, the user may read "PAGE 1" of P1 disposed below the "OO MAIN" of P3 displayed on the first display screen 10 (i.e. NO of step S6, thus proceeding to FIG. 11). First, the uppermost layer of the "OO MAIN" of P3 needs to be performed. Specifically, the user touches the tab of the "OO MAIN" of P3, which is a moved subject currently displayed on the first display screen 10, with a finger or a stylus pen and performs a slide operation to slide the moved subject toward the second display screen 20, which is a destination of movement, as shown in FIG. 7 (see reference numerals T4 and T4'). That is, the user drags the tab of the "OO MAIN" of P3 toward the second display screen 20 (i.e. YES of step S11, and YES of step S12). Thus, the operation reception unit 42 of the information processing terminal 100 receives an operation to move display data of the first display screen 10 (i.e. an operation reception process).

The display control unit 41 moves and displays display data of the "OO MAIN" of P3, corresponding to the dragged tab, on the second display screen 20 (step S13). At this time, the "OO MAIN" of P3 is displayed over the "ΔΔ SITE" of P4 already displayed on the second display screen 20, i.e. in the uppermost layer of the second display screen 20 as shown in FIG. 8 (step S14, i.e. a display control process). Therefore, only the tabs of the "ΔΔ SITE" of P4 and "PAGE 2" of P2 disposed in lower layers, indicating their "PAGE TITLE", are displayed in the upper section.

When the user simply touches the tab but does not drag it (i.e. NO of step S12), display data corresponding to the selected tab is displayed in the uppermost layer (step S15). When the user touches the tab of the "PAGE 1" of P1 disposed in a lower layer of the first display screen 10 in FIG. 7, for example, the "PAGE 1" of P1 is transposed to the uppermost layer of the first display screen 10 and thus displayed on the first display screen 10.

A method of moving display data is not necessarily limited to the above method of the tab sliding operation. For example, display data can be moved upon touching and sliding a preset display area instead of a tab of display data. Alternatively, the user may touches an arbitrary point on the "OO MAIN" of P3, which is a moved subject displayed on the first display screen 10, with a finger or a stylus pen and performs a slide operation to move the moved subject toward the second display screen 20, which is a destination of movement, as shown in FIG. 9 (see reference numeral T5 and T5'), so that the operation reception unit 42 receives the slide operation. Upon detecting a touch and slide operation on the "OO MAIN" of P3, the display control unit 41 may move and display the display data of the "OO MAIN" of P3 corresponding to the touched tab on the second display screen 20 as shown in FIG. 8.

The method of moving display data can be further simplified. For example, a user can move display data, which is a moved subject, by simply performing a slide operation of a finger or a stylus pen in a direction toward a display screen, which is a destination of movement, at an arbitrary point or a specific point on the display data. Alternatively, the slide operation for sliding a moved subject toward the display screen serving as a destination of movement is not necessarily needed, whereas display data can be moved by way of a slide operation for simply sliding a finger or a stylus pen in an arbitrary direction on the display data serving as a moved subject.

Since the present embodiment is able to move display data in response to a user's slide operation on a touch panel, the present embodiment achieves an intuitive operation such that a user' sensation of manipulation can agree with the movement of data. Thus, it is possible to improve the usability in handling display data on the information processing terminal.

(Second Embodiment)

Figure 12:
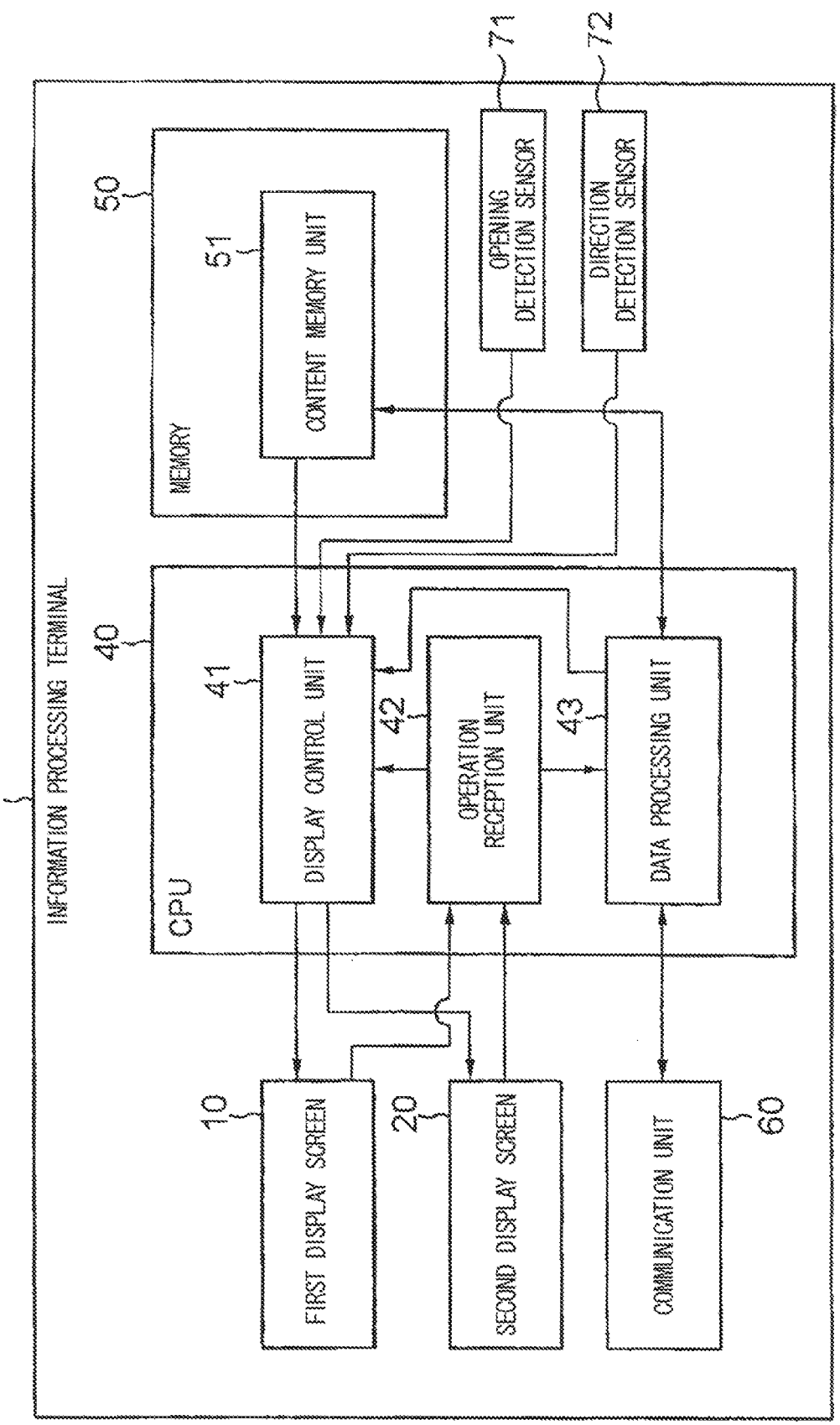
[FIG. 12] A block diagram showing a configuration of an information processing terminal according to a second embodiment.
Figure 13:
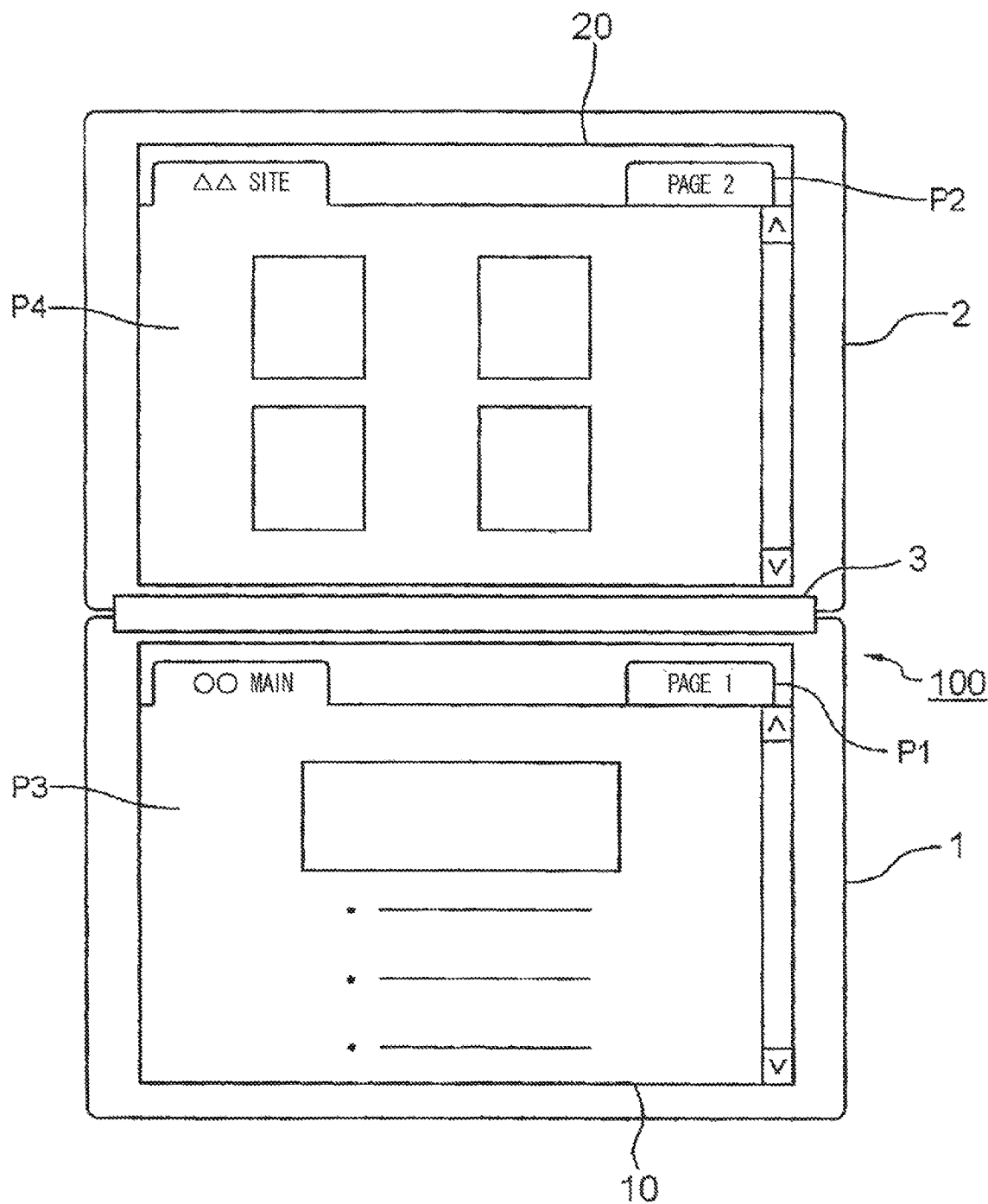
[FIG. 13] A drawing showing an operation and a display manner of the information processing terminal shown in FIG. 12.
Figure 14:
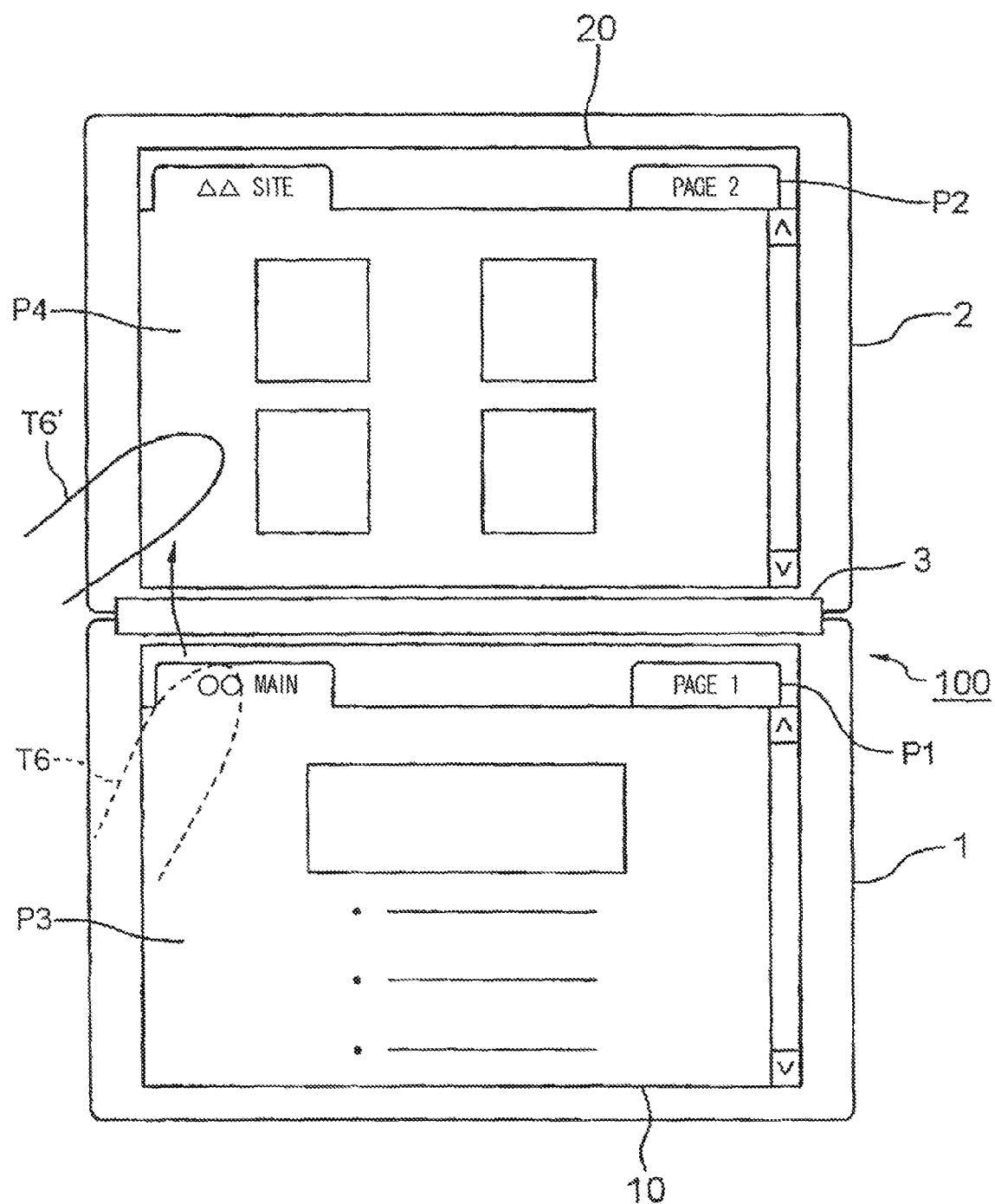
[FIG. 14] A drawing showing an operation and a display manner of the information processing terminal shown in FIG. 12.
Figure 15:
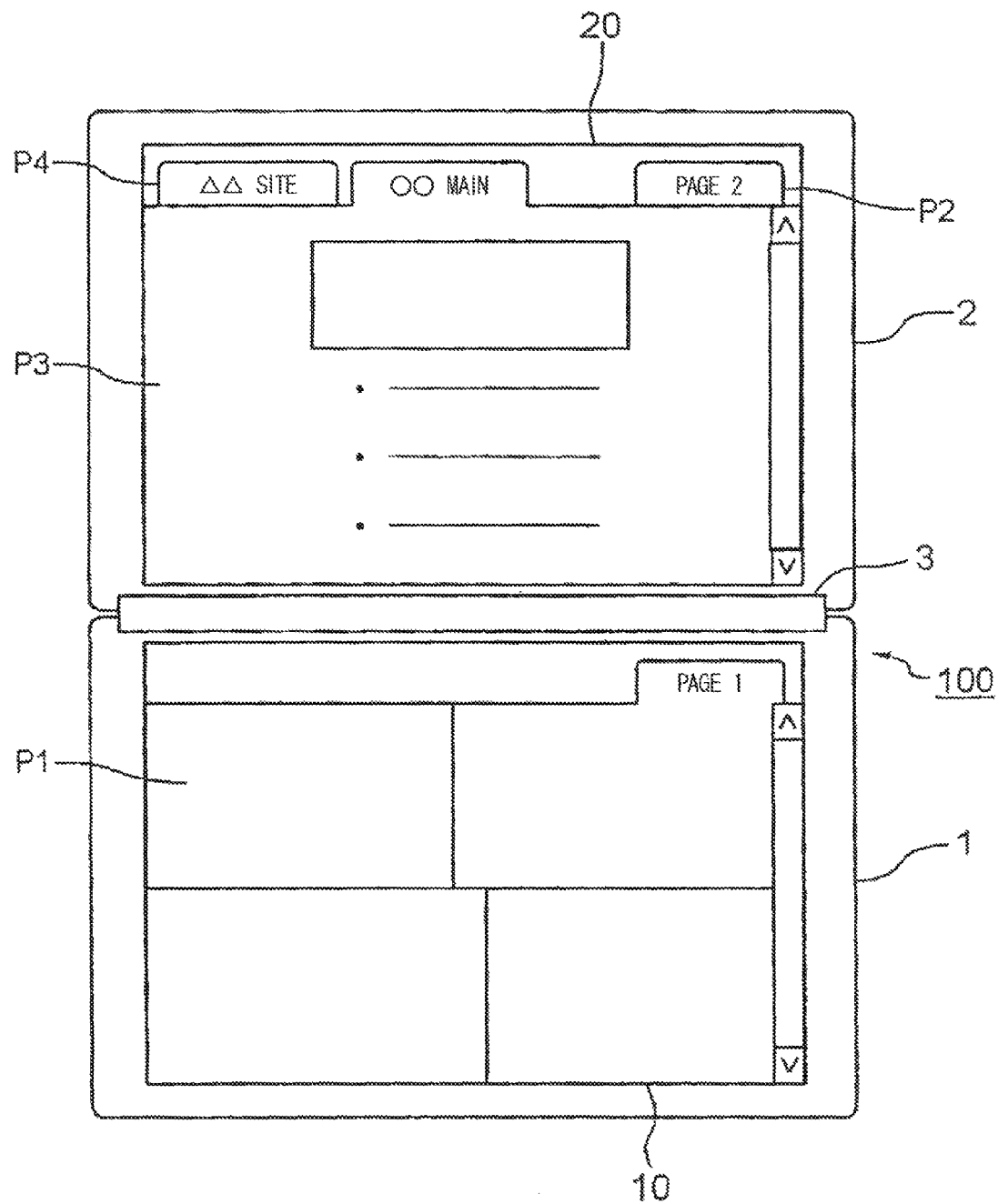
[FIG. 15] A drawing showing an operation and a display manner of the information processing terminal shown in FIG. 12.
Figure 16:
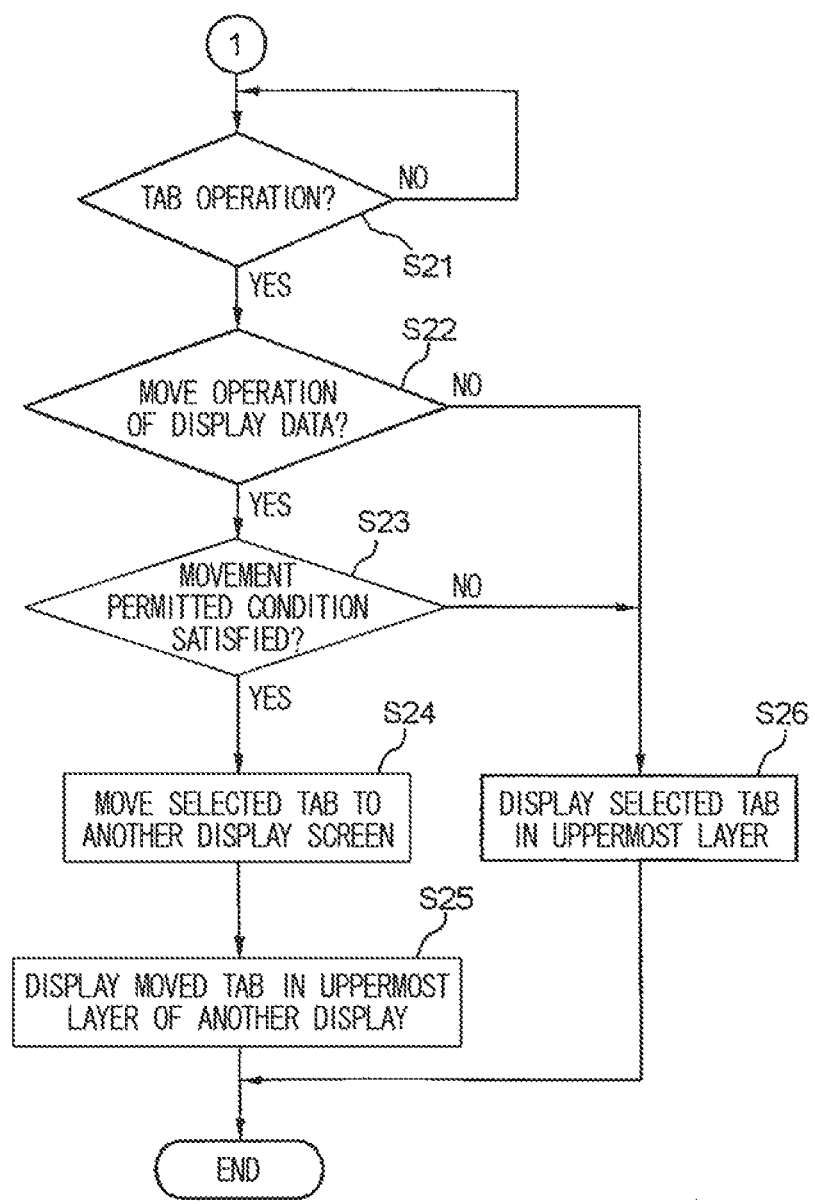
[FIG. 16] A flowchart showing the operation of the information processing terminal shown in FIG. 12.

Next, a second embodiment of the present invention will be described with reference to FIGS. 12 to 16. FIG. 12 is a functional block diagram showing the configuration of an information processing terminal according to the present embodiment. FIGS. 13 to 15 are drawings each showing an operation and a display manner of the information processing terminal. FIG. 16 is a flowchart showing the operation of the information processing terminal.

(Configuration)

The information processing terminal 100 (or an information processing device) of the present invention adopts the same configuration as the foregoing one described in the first embodiment. That is, the information processing terminal 100 is a fold-type information processing terminal in which the first unit 1 and the second unit 2 are interconnected via the hinge 3 so that they are freely opened or closed. The first unit 1 is equipped with the first display screen 10 having a touch panel on the surface whilst the second unit 2 is equipped with the second display screen 20 having a touch panel on the surface.

As shown in FIG. 12, the CPU 40 serving as an arithmetic unit, the memory 50 serving as a storage unit, and the communication unit 60 ensuring wireless communication are installed inside the information processing terminal 100 of the present embodiment. In addition, the CPU 40 includes the display control unit 41, the operation reception unit 42, and the data processing unit 43, which are configured using programs loaded into the CPU 40. The memory 50 includes the content memory unit 51. These constituent elements have the same function as the foregoing ones of the first embodiment.

Furthermore, the information processing terminal 100 includes an opening detection sensor 71 (or an opening detector) and a direction detection sensor 72 (or a direction detector), which collectively serve as a position detection unit for detecting the position of the terminal itself. Upon inputting the foregoing slide operation on the condition that the position of the terminal 100 detected by the sensors 71 and 72 agrees with a predetermined position, the display control unit 41 performs processing to move and display the display data of one display screen on another display screen. The details of this configuration will be described later.

The opening detection sensor 71 has a function to detect a degree of opening between the first display screen 10 and the second display screen 20 which are interconnected together in a free open/close manner. In the present embodiment, the opening detection sensor 71 is configured to detect the maximally opened state of the first display screen 10 and the second display screen 20, i.e. an opened state in which they are horizontally placed on the same plane. This function can be achieved using a sensor for detecting a rotation angle of the hinge 3 interconnecting the first display screen 10 and the second display screen 20 in a free open/close manner. Alternatively, it can be achieved using a switch whose contact is turned on when the display screens 10 and 20 are maximally opened. The degree of opening between the display screens 10 and 20 can be realized using any types of measures. The opening detection sensor 71 operates to notify the display control unit 41 with the degree of opening between the display screens 10 and 20 in a certain period of time or when the degree of opening reaches a predetermined value. Alternatively, the opening detection sensor 71 may normally detect the degree of opening between the display screens 10 and 20 so as to notify it to the display control unit 41 upon requested.

The direction detection sensor 72 has a function to detect the direction of the display screens 10 and 20. In particular, the present embodiment allows a user to simultaneously browse the first display screen 10 and the second display screen 20 which are engaged to horizontally adjoin together via the hinge 3 in a horizontal position shown in FIG. 1, wherein the present embodiment has a function to detect a vertical position of the display screens 10 and 20 as shown in FIG. 13, in which they are rotated by 90 degrees from the horizontal position. For example, the direction detection sensor 72 may be configured of an acceleration sensor to detect the vertical position of the display screens 10 and 20 in a gravitational direction, thus detecting and notifying the state of FIG. 13 to the display control unit 41. In addition, the direction detection sensor 72 operates to notify the direction of the terminal 100 to the display control unit 41 in a certain period of time or when the direction is changed. Alternatively, the direction detection sensor 72 may normally detect the direction of the terminal 100 so as to notify the direction to the display control unit 41 upon requested.

In the present embodiment, the display control unit 41 receives communications from the opening detection sensor 71 and the direction detection sensor 72 so as to grasp the position of the terminal 100. The display control unit 41 determines that a movement permitted condition for permitting a movement of display data between the display screens 10 and 20 can be satisfied when the display screens 10 and 20 are opened and placed on the same plane in the vertical position of the display screens 10 and 20. In the position satisfying the above condition, upon detecting an event in which a tab of display data displayed on the first display screen 10 is being dragged toward the second display screen 20 (by way of a slide operation) as shown in FIG. 14 (see reference numerals T6 and T6'), the display control unit 41 moves and displays the display data corresponding to the dragged tab from the first display screen 10 to the second display screen 20. Similar to the first embodiment, display data disposed in the uppermost layer of the first display screen 10 is transposed and displayed in the uppermost layer of the second display screen 20.

The movement permitted condition that permits the movement of display data between the first display unit 10 and the second display unit 20 is not necessarily limited to the above condition. For example, the movement permitted condition of display data may refer to the condition in which the opening detection sensor 71 detects that the display screens 10 and 20 are opened and placed on the same plane or the condition in which they are not perfectly opened and placed on the same plane but they are opened at a predetermined angle or more. Alternatively, the movement permitted condition of display data may refer to only the condition that the direction detection sensor 72 detects the vertical position of the display screens 10 and 20. Moreover, the movement permitted condition may refer to the condition in which the display screens 10 and 20 are oriented in another predetermined direction.

(Operation)

Next, the operation of the information processing terminal 100 having the foregoing configuration will be described with reference to a flowchart of FIG. 16. As shown in FIG. 6 described in conjunction with the first embodiment, a plurality of display data is overlapped on the display screens 10 and 20. Specifically, "OO MAIN" of P3 is displayed in the uppermost layer of the first display screen 10, and "PAGE 1" of PI is disposed in a lower layer such that only the tab thereof is displayed in the upper section. In addition, "ΔΔ SITE" of P4 is displayed in the uppermost layer of the second display screen 20, and "PAGE 2" of P2 is disposed in a lower layer such that only the tab thereof is displayed in the upper section.

When the terminal 100 is rotated at 90 degrees, the direction detection sensor 72 detects a 90-degree rotation of the terminal 100, so that the display control unit 41 rotates display data by 90 degrees on the display screens 10 and 20. That is, as shown in FIG. 13, display data are rotated such that the upper/lower portions thereof are disposed along the long sides of the display screens 10 and 20 each having a rectangular shape.

In order to read the "PAGE 1" of P1 disposed below the "OO MAIN" of P3 displayed on the first display screen 10, a user performs an operation to move the "OO MAIN" of P3 currently disposed in the uppermost layer. Specifically, the user touches the tab of the "OO MAIN" of P3, which is a moved subject displayed on the first display screen 10, with a finger or a stylus pen and performs a slide operation to slide it toward the second display screen 20 which is a destination of movement as shown in FIG. 14 (see reference numeral T6 and T6'). That is, the user drags the tab of the "OO MAIN" of P3 toward the second display screen 20 (i.e. YES of step S21, and YES of step S22). Thus, the operation reception unit 42 receives the above operation (i.e. an operation reception process).

At this time, the display control unit 41 makes a decision based on communications from the opening detection sensor 71 and the direction detection sensor 72, as to whether or not the movement permitted condition of display data is satisfied. When the movement permitted condition of display data is satisfied (i.e. YES of step S23) since the display screens 10 and 20 are opened and placed on the same plane in the vertical position, the display control unit 41 moves and displays the display data of the "OO MAIN" of P3 corresponding to the dragged tab on the second display screen 20 (step S24). At this time, the "OO MAIN" of P3 is displayed above the "ΔΔ SITE" of P4 already displayed on the second display screen 20, i.e. in the uppermost layer of the second display screen 20 as shown in FIG. 15 (step S25 regarding a display control process). Thus, only the tabs of the "ΔΔ SITE" of P4 and "PAGE 2" of P2 disposed in lower layers, indicating their "PAGE TITLE", are displayed in the upper section.

When a user simply touches a tab but does not drag it (i.e. NO of step S22), or when the user drags the tab without satisfying the movement permitted condition of display data (i.e. NO of step S23), display data corresponding to the selected tab is displayed in the uppermost layer (step S26).

In the present embodiment, the movement operation method of display data is not necessarily limited to the slide operation of a tab. For example, a user may move display data upon touching and sliding a predetermined display region of display data instead of a tab. Alternatively, a user may move display data upon touching and sliding an arbitrary point of display data toward another display screen serving as a destination of movement. In addition, a user may move display data upon simply performing a slide operation on display data, which is a moved subject, toward another display screen serving as a destination of movement. Furthermore, a user may move display data upon simply performing a slide operation on display data serving as a moved subject in an arbitrary direction.

In the present embodiment, which allows display data to move toward another display screen in response to a user's slide operation on a touch panel, it is possible to perform manipulation intuitively since the user's sensation of manipulation agrees with the movement of data. Therefore, it is possible to improve usability in displaying data with an information processing terminal.

The present embodiment allows display data to be moved and displayed on another display screen in response to the foregoing slide operation when a degree of opening or a direction of a pair of display screens, which can be freely opened or closed, satisfies a predetermined condition, i.e. when the terminal is disposed in a predetermined position. Thus, it is possible to suppress display data from being unnecessarily moved between display screens, thus further improving usability.

The present invention is not necessarily limited to the foregoing embodiments; hence, appropriate modifications or design changes may be embraced within the scope of the present invention unless they deviate from the scope of the present invention.

INDUSTRIAL APPLICABILITY

The present invention is applicable to information processing devices having multiple display screens, such as fold-type portable information processing terminals; hence, the present invention has an industrial applicability.

Description Of Reference Numerals

1 First unit
2 Second unit
3 Hinge
10 First display screen
20 Second display screen
40 CPU
41 Display control unit
42 Operation reception unit
43 Data processing unit
50 Memory
51 Content memory unit
60 Communication unit
71 Opening detection sensor
72 Direction detection sensor
100 Information processing terminal

The invention claimed is:

1. An information processing device comprising:
a plurality of display screens;
a display control unit that controls a display operation on each of the display screens;
a touch panel that is attached to a surface of at least one display screen; and
an operation reception unit that receives a depression input externally applied to the touch panel with a pressing member; and
a position detection unit that detects a position of the information processing device,
wherein when the operation reception unit receives a slide operation sliding the pressing member on the touch panel, the display control unit determines whether a movement permitted condition has been satisfied based on the detected position of the information processing device, and when the display control unit determines that the movement permitted condition has been satisfied, the display control unit moves display data of one display screen having the touch panel to another display screen.

2. The information processing device according to claim 1, wherein when the operation reception unit receives the slide operation on the touch panel indicating a transition from one display screen having the touch panel to another display screen, the display control unit moves the display data of one display screen to another display screen.

3. The information processing device according to claim 2, wherein a touch panel is attached to a surface of another display screen, and wherein the operation reception unit receives the slide operation on the touch panel indicating a transition from one display screen to another display screen, the display control moves the display data of one display screen to another display screen.

4. The information processing device according to claim 2, wherein when the operation reception unit receives a slide operation on a predetermined region of the display data of one display screen having the touch panel toward another display screen, the display control unit moves the display data of one display screen to another display screen.

5. The information processing device according to claim 1, wherein the position detection unit includes an opening detection sensor that detects an opening between one display screen and another display screen which are engaged in a free open/close manner, and wherein when the operation reception unit receives the slide operation while the opening detection sensor detects a predetermined angle of opening between one display screen and another display screen, the display control unit moves the display data of one display screen to another display screen.

6. The information processing device according to claim 5, wherein when the operation reception unit receives the slide operation while the opening detection sensor detects an opened state in which one display screen and another display screen are opened and placed on a same plane, the display control unit moves the display data of one display screen to another display screen.

7. The information processing device according to claim 1, wherein the position detection unit includes a direction detection sensor that detects a direction of the display screens, and wherein when the operation reception unit receives the slide operation the direction detection sensor detects a predetermined direction of the display screens, the display control unit moves the display data of one display screen to another display screen.

8. The information processing device according to claim 7, wherein one display screen and another display screen adjoin to concurrently show their contents, and wherein when the operation reception unit receives the slide operation while the direction detection sensor detects a vertical position of the display screens, the display control unit moves the display data of one display screen to another display screen.

9. The information processing device according to claim 8, wherein when the operation reception unit receives the slide operation while the opening detection sensor detects an opened state in which one display screen and another display screen are opened and placed on a same plane and while the direction detection sensor detects a vertical position of the display screens, the display control unit moves the display data of one display screen to another display screen.

10. The information processing device according to claim 1, wherein when the operation reception unit receives the slide operation with respect to display data displayed in an uppermost layer among a plurality of display data which are layered and overlapped on one display screen, the display control unit moves the display data of the uppermost layer of one display screen to another display screen.

11. The information processing device according to claim 1, further comprising a data processing unit which receives a predetermined operator command with respect to display data on one display screen and which performs processing based on the display data on one display screen and the operator command received with the operation reception unit, wherein the display control unit displays data representing a processing result of the data processing unit on another display screen instead of one display screen.

12. The information processing device according to claim 11, wherein the data processing unit accesses a data storage area corresponding to the operator command so as to fetch data corresponding to the display data on one display screen, and wherein the display control unit displays the data fetched by the data processing unit on another display screen.

13. An information processing program adapted to an information processing device including a plurality of display screens and a touch panel attached to a surface of at least one display screen, comprising the steps of:
controlling a display operation with respect to each of the display screen;
receiving a depression input externally applied to the touch panel by a predetermined pressing member;
detecting a position of the information processing device;
determining whether a movement permitted condition is satisfied based on the detected position of the information processing device; and
when the movement permitted condition has been determined to have been satisfied, upon receiving a slide operation sliding the pressing member on the touch panel, moving display data of one display screen having the touch panel to another display screen.

14. The information processing program according to claim 13, further comprising the step of: moving the display data of one display screen to another display screen upon receiving the slide operation indicating a transition from one display screen having the touch panel to another display screen.

15. A display control method comprising:
an operation reception process that receives a depression input externally applied to a touch panel attached to a surface of at least one of a plurality of display screens by a predetermined pressing member; and
a display control process that controls a display operation with respect to each of the display screens in response to the depression input received by the operation reception process, the display operation including detecting a position of the at least one of the plurality of display screens and determining whether a movement permitted condition has been satisfied based on the detected position of the at least one of the plurality of display screens,
wherein when the movement permitted condition has been determined to have been satisfied and when the operation reception process receives a slide operation sliding the predetermined pressing member on the touch panel, the display control process moves display data of one display screen having the touch panel to another display screen.

16. The display control method according to claim 15, wherein when the operation reception process receives the slide operation on the touch panel indicating a transition from one display screen to another display screen, the display control process moves the display data of one display screen to another display screen.

17. The display control method according to claim 15, wherein when the operation reception process receives the slide operation while the display control process detects a predetermined position of an information processing device, the display control process moves the display data of one display screen on to another display screen.

18. An information processing device comprising:
  a plurality of display screens which are arbitrarily opened or closed;
  a display control unit that controls a display operation on each of the display screens;
  a touch panel that is attached to a surface of at least one display screen;
  an operation reception unit that receives a depression input externally applied to the touch panel with a pressing member; and
  a determination unit that determines whether or not a predetermined condition is satisfied based on a physical position and an opening between one display screen and another display screen,
  wherein when the operation reception unit receives a slide operation indicating a transition from one display screen to another display screen, the display control unit moves display data of one display screen having the touch panel to another display screen based on the predetermined condition.

19. The information processing device according to claim 18, wherein the display control unit allows display data of one display screen to move to another display screen for each tab or for each page.

* * * * *